United States Patent
Fraison et al.

(10) Patent No.: US 11,597,432 B2
(45) Date of Patent: Mar. 7, 2023

(54) PERCEPTION OF A ROAD PROFILE BY THE VARYING A GAIN AS A FUNCTION OF A VEHICLE SPEED AND STEERING WHEEL TORQUE

(71) Applicant: JTEKT EUROPE, Irigny (FR)

(72) Inventors: Quentin Fraison, Irigny (FR); Pascal Moulaire, La Tour de Salvagny (FR); André Michelis, Chonas l'Amballan (FR)

(73) Assignee: JTEKT EUROPE, Irigny (FR)

( * ) Notice: Subject to any disclaimer, the term of this patent is extended or adjusted under 35 U.S.C. 154(b) by 267 days.

(21) Appl. No.: 16/956,671

(22) PCT Filed: Dec. 17, 2018

(86) PCT No.: PCT/FR2018/053324
§ 371 (c)(1),
(2) Date: Jun. 22, 2020

(87) PCT Pub. No.: WO2019/122647
PCT Pub. Date: Jun. 27, 2019

(65) Prior Publication Data
US 2020/0317259 A1    Oct. 8, 2020

(30) Foreign Application Priority Data

Dec. 20, 2017   (FR) ................................. 17/62593

(51) Int. Cl.
*B62D 5/04*    (2006.01)
*B62D 1/04*    (2006.01)
*G01L 5/22*    (2006.01)

(52) U.S. Cl.
CPC .............. *B62D 5/0463* (2013.01); *B62D 1/04* (2013.01); *G01L 5/221* (2013.01)

(58) Field of Classification Search
CPC .......... B62D 5/0463; B62D 1/04; G01L 5/221
See application file for complete search history.

(56) References Cited

U.S. PATENT DOCUMENTS 5,117,934 A * 6/1992 Tsuyama ................. B60T 8/175
                                                    180/197
5,398,953 A * 3/1995 Shimizu ............... B62D 5/0463
                                                    701/41

(Continued)

FOREIGN PATENT DOCUMENTS

WO      2016/203171 A1    12/2016

OTHER PUBLICATIONS

Apr. 15, 2019 Search Report issued in International Patent Application No. PCT/FR2018/053324.

*Primary Examiner* — Gertrude Arthur Jeanglaude
(74) *Attorney, Agent, or Firm* — Oliff PLC

(57) ABSTRACT

A power-steering system for a motor vehicle includes a steering wheel and an assistance motor controlled by a closed-loop regulation system, the regulation system determining a motor torque of the assistance motor as a function of a measured steering-wheel torque, using at least one "setpoint monitoring" arm calculating a component of the motor torque, referred to as "variant motor torque", by subtracting a set steering-wheel torque from the RFe corresponding to the sum of the measured steering-wheel torque and the motor torque, wherein the variant motor torque is multiplied by a gain determined by a three-dimensional map as a function of a vehicle speed and the measured steering-wheel torque.

9 Claims, 2 Drawing Sheets

(56) References Cited

U.S. PATENT DOCUMENTS

2011/0224876 A1\* 9/2011 Paholics ............. B62D 5/0463
  701/42
2017/0247048 A1 8/2017 Namikawa et al.

\* cited by examiner

PERCEPTION OF A ROAD PROFILE BY THE VARYING A GAIN AS A FUNCTION OF A VEHICLE SPEED AND STEERING WHEEL TORQUE

The invention concerns the field of power steering for a motor vehicle and more particularly to a closed loop regulation system for a torque of an assist motor as a function of a torque exerted on a steering wheel by a driver.

A power steering system for a motor vehicle comprises a steering wheel on which a driver applies a force, called «applied steering wheel torque», in order to maneuver a rack making it possible to orient the wheels of the vehicle. An electric assist motor, controlled by a regulation system, allows assisting the driver in his intention to turn the wheels of the vehicle by providing a torque of the assist motor which reduces the steering wheel torque to be applied. This is called the steering wheel torque felt by the driver.

Ultimately, the steering wheel torque felt by the driver is identical to the applied steering wheel torque. This steering wheel torque can be measured by means of a torque sensor, so we will talk in the following description about the measured steering wheel torque.

Figure 3:
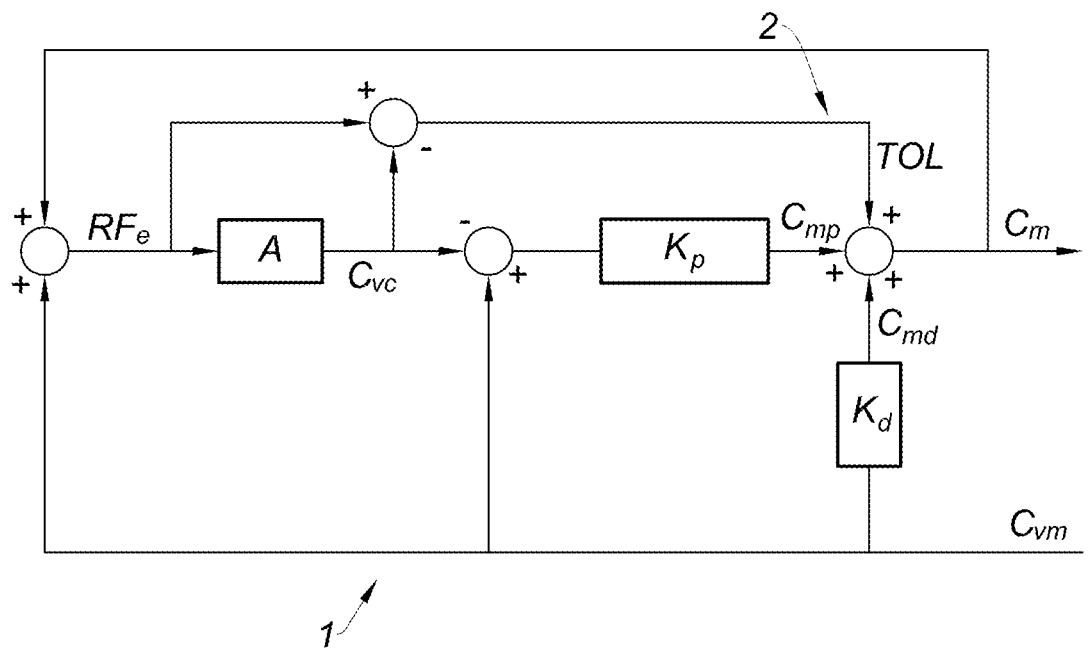

As represented in FIG. 3, the regulation system 1 of the power steering system determines the torque of the assist motor $C_m$, called «motor torque», in particular as a function of the measured steering wheel torque $C_{vm}$.

Thus, the motor torque $C_m$ has an influence on the measured steering wheel torque $C_{vm}$, and vice versa.

Moreover, the increasingly efficient regulation system 1 integrates a plurality of electronic and software functions (not represented) making it possible to adjust the measured steering wheel torque $C_{vm}$ in order to best meet the expectations of drivers. For example, the functions allow improving:
- a stability, that is to say a convergence, of the regulation system with respect to disturbances such as rapid variations in the direction of rotation of the steering wheel,
- a feeling of the mechanical behavior of the power steering system such as the feeling of dynamic dry friction, viscosity, detachment (that is to say a threshold of force that the driver must overcome to trigger a displacement of the steering system), or an inertia of the power steering system,
- a comfort in maneuvering, that is to say a damping of the steering wheel in a steering wheel situation not held by the driver, and a steering wheel restoring making it possible to bring the steering wheel back to a central position (that is to say a position of the steering wheel in which the vehicle follows a straight path).

Generally, the closed loop regulation system 1 includes:
a setpoint monitoring branch 2 calculating the deviation motor torque TOL by subtracting a setpoint steering wheel torque $C_{vc}$ (steering wheel torque which we want the driver to feel, it is determined by the application A of a first assist law as a function of the sum of the measured steering wheel torque $C_{vm}$ and of the motor torque $C_m$, that is to say as a function of RFe) from the RFe.
a proportional branch Kp determining a proportional motor torque $C_{mp}$ as a function of a difference between the measured steering wheel torque $C_{vm}$ and the setpoint steering wheel torque $C_{vc}$,
and a derived branch Kd estimating a derived motor torque $C_{md}$ as a function of the temporal derivative of the measured steering wheel torque $C_{vm}$.

The motor torque $C_m$ is the sum of the components of each branch 2, Kp, Kd, that is to say of the derived motor torque $C_{md}$, of the deviation motor torque TOL and of the proportional motor torque $C_{mp}$.

A study on each of the branches shows that the contribution of the setpoint monitoring branch 2 has a preponderant role in determining the motor torque $C_m$ in order to monitor the setpoint steering wheel torque $C_{vc}$. The contributions of the proportional branch Kp and of the derived branch Kd allow, for their part, to follow the dynamic variations and to stabilize the regulation system, in order to reach more quickly the setpoint steering wheel torque $C_{vc}$, that is to say decrease the time to establish steady state.

The regulation system 1 by controlling the measured steering wheel torque $C_{vm}$, and therefore the steering wheel torque felt by the driver, decreases a feedback of the information associated with the road profile.

The set of intrinsic physical characteristics of the surface on which the vehicle is displaced, is called the road profile, such as, for example, a grip, or the height and depth of a deformation of the road linked to the presence a gutter, a sidewalk, a pothole, cobblestones or a speed bump.

Thus, in certain situations, the regulation system 1 gives the driver a fairly artificial driving feeling which can be dangerous, unpleasant or even counter-intuitive.

The setpoint monitoring branch 2 mainly decreases a rise in information concerning few road deformations, that is to say low frequencies, mainly between 0 and 5 Hz such as a sidewalk of low height for example. By way of comparison, grains in the road have a frequency of about 50 Hz, while cobblestones have a frequency comprised between 5 and 30 Hz, depending on the size of said cobblestones.

Car manufacturers want the measured steering wheel torque $C_{vm}$, therefore the felt steering wheel torque, to allow the driver to obtain the information associated with the road profile, in particular on low-frequency deformations. The measured steering wheel torque $C_{vm}$ must therefore allow the driver to judge the path of the vehicle at all times, without degrading all of the functions of the regulation system.

The object of the invention is to remedy all or part of the aforementioned drawbacks by proposing a power steering system for a motor vehicle comprising a steering wheel and an assist motor controlled by a closed loop regulation system, said regulation system determining a motor torque of the assist motor as a function of a measured steering wheel torque, by means of at least one «setpoint monitoring» branch calculating a component of the motor torque of the assist motor, called «deviation motor torque», by subtracting a setpoint steering wheel torque, defined as a steering wheel torque that we want a driver to feel, from the RFe corresponding to the sum of the measured steering wheel torque and the motor torque of the assist motor, characterized in that the deviation motor torque is multiplied by a gain determined by a three-dimensional mapping depending in particular on a vehicle speed and the measured steering wheel torque.

The torque of the assist motor, called «motor torque», corresponds to the torque exerted by the assist motor on a rack of the power steering system so as to assist a driver in his intention to turn the wheels of the vehicle.

It is defined that the measured steering wheel torque corresponds to a force exerted by the driver on the steering wheel of the power steering system, identical to a steering wheel torque felt by the driver.

The setpoint steering wheel torque is the steering wheel torque that the driver is desired to feel. The setpoint steering wheel torque is determined by applying a first assist law as a function of RFe, that is to say the sum of the motor torque and the measured steering wheel torque.

According to the invention, the setpoint monitoring branch multiplies the deviation motor torque by a gain determined by a three-dimensional mapping as a function of a vehicle speed and the measured steering wheel torque.

The component of the motor torque determined by the setpoint monitoring branch is therefore variable.

Preferably, the gain is comprised between 0 and 1.

Thus, it is possible to reduce the value of the component of the setpoint monitoring branch in the calculation of the motor torque, that is to say that the determined motor torque will be lower than that applied without the invention. The reduction in motor torque makes it possible to improve the driving experience by reducing the assistance provided to the driver in his intention to turn or retain the wheels of the vehicle. The measured steering wheel torque, that is to say the steering wheel torque felt by the driver, will therefore be greater.

Particularly, the driver will better feel deformations of the road at low frequencies.

Advantageously, the gain is determined by a three-dimensional mapping using several input parameters, here at least two input parameters, namely a vehicle speed and a measured steering wheel torque.

Thus, the gain is adjusted as a function of parameters which accurately and completely characterize the life situation of the vehicle.

According to a characteristic of the invention, the gain is variable as a function of a longitudinal speed of the vehicle.

According to a characteristic of the invention, the gain is variable as a function of the absolute value of the measured steering wheel torque.

According to a characteristic of the invention, the three-dimensional mapping comprises at least one area of improving the feeling in which the gain is strictly less than 1 and at least one area of assistance in which the gain is strictly equal to 1.

Thus, in at least one area of improving the feeling, the motor torque, lower than the motor torque determined without the invention, makes it possible to improve the feeling of the road profile, while in at least one area of assistance, the motor torque is identical to the motor torque determined without the invention to assist the driver in his intention to turn the wheels of the vehicle.

According to a characteristic of the invention, a first area of assistance extends beyond a predetermined steering wheel torque threshold.

When the measured steering wheel torque is greater than a predetermined steering wheel torque, the driver wants to turn the wheels of the vehicle to perform a curved path. Thus, the power steering system must therefore have maximum performance, that is to say a motor torque identical to the motor torque determined without the invention, to assist the driver in his intention.

According to a characteristic of the invention, the predetermined steering wheel torque threshold is equal to or less than a measurement range of a measured steering wheel torque sensor.

According to a characteristic of the invention, the predetermined steering wheel torque threshold is for example equal to or less than 5 Nm, preferably equal to or less than 3 Nm, or even equal to or less than 2 Nm.

According to a characteristic of the invention, a first area of improving the feeling extends from a predetermined vehicle speed threshold and of a measured steering wheel torque to the predetermined steering wheel torque threshold.

When the measured steering wheel torque is lower than the predetermined steering wheel torque, the driver wants to make a substantially straight path. The power steering system must therefore promote the feeling of the road profile rather than assisting the driver to turn the wheels of the vehicle.

Thus, when the vehicle speed is greater than the predetermined vehicle speed threshold and the measured steering wheel torque is lower than the predetermined steering wheel torque, the gain is variable between 0 and 1.

Preferably, the gain linearly varies between 0 and 1 between a zero-measured steering wheel torque and the predetermined steering wheel torque threshold.

According to a characteristic of the invention, the gain is substantially equal to 0 when the measured steering wheel torque is substantially equal to 0 and the vehicle speed is greater than an ascent vehicle speed threshold, that is to say a speed threshold where the need to feel the profile or ascent the road becomes preponderant over the need to reduce a feeling of mechanical friction of the power steering system, higher than the predetermined vehicle speed threshold.

This improves the feeling of the road profile as much as possible when the vehicle is displaced substantially in a straight line, low-measured steering wheel torque, and at a relatively high speed, that is to say a speed greater than the ascent vehicle speed threshold.

Below the ascent vehicle speed threshold, when the measured steering wheel torque is substantially equal to 0, the gain varies linearly, or preferably non-linearly, between a zero vehicle speed and the ascent vehicle speed threshold. In fact, when the vehicle speed becomes lower than the ascent vehicle speed threshold, the power steering system must be more efficient so that the driver does not feel imperfections in the mechanical behavior of the steering system, such as friction, and improving maneuvering comfort, associated with a steering wheel restoring. A compromise must be found between the pleasure and the safety of the driver associated with the feeling of the road profile and the maneuvering comfort.

According to a characteristic of the invention, the predetermined speed threshold is equal to or lower than 80 km/h, preferably equal to or lower than 60 km/h, or even equal to or lower than 25 km/h.

According to a characteristic of the invention, a second assistance area extends between a zero vehicle speed up to the predetermined vehicle speed threshold and extends between a low speed steering wheel torque threshold, lower than the predetermined steering wheel torque threshold, up to the predetermined steering wheel torque threshold.

When the vehicle speed is comprised between 0 and the predetermined vehicle speed threshold and the measured steering wheel torque is between the low speed steering wheel torque threshold and the predetermined steering wheel torque threshold, the vehicle is in a parking or maneuvering situation. Thus, the power steering system must promote assistance to the driver to turn the wheels of the vehicle, which is why the gain is equal to 1.

According to a characteristic of the invention, the low speed steering wheel torque threshold is equal to or less than 1 Nm, or to 0.5 Nm, or even equal to or less than 0.25 Nm.

According to a characteristic of the invention, a second area of improving the feeling extends from a zero vehicle speed to the predetermined vehicle speed threshold and extends from a measured steering wheel torque to the low speed steering wheel torque threshold.

Thus, the power steering system promotes the feeling of the road profile by the driver at very low speed.

Figure 1:
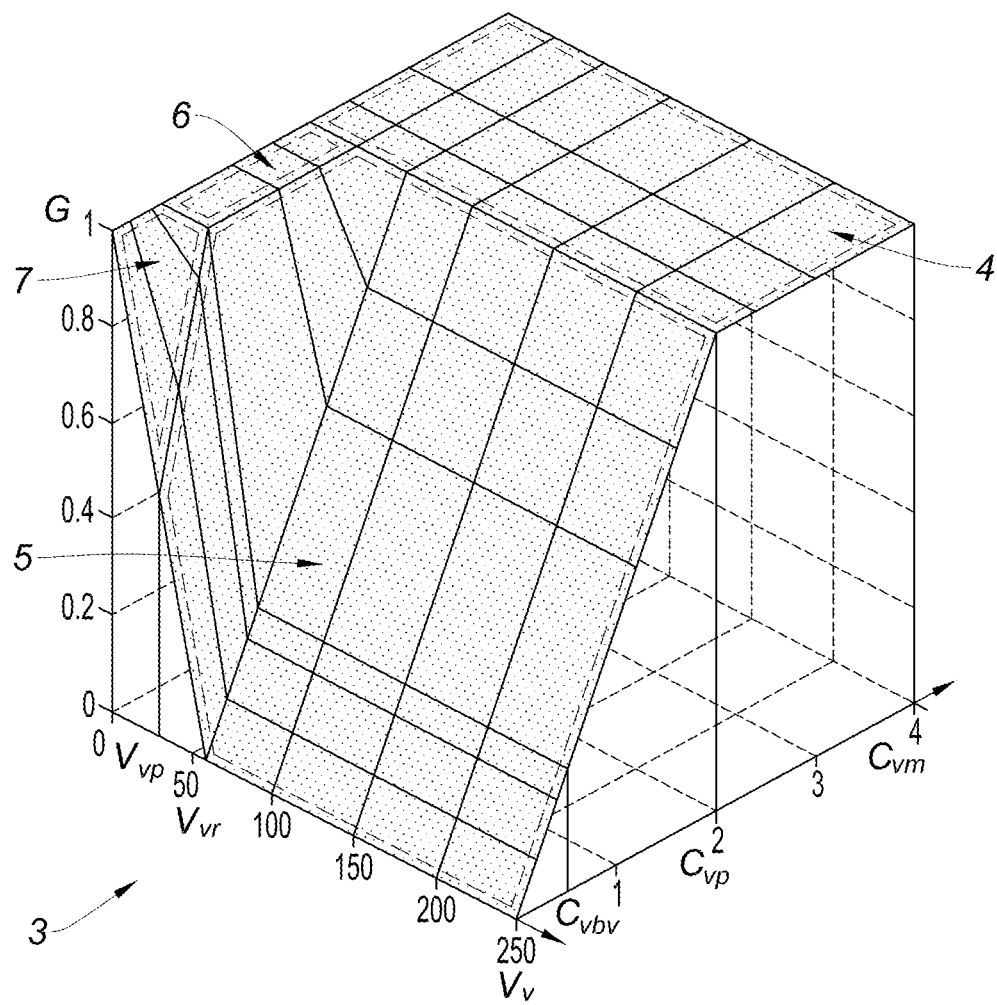
Figure 2:
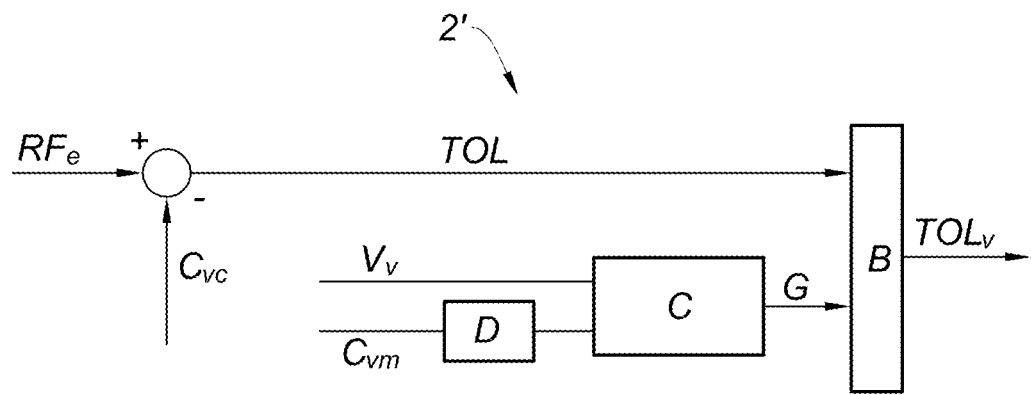

The invention will be better understood thanks to the following description, which relates to an embodiment according to the present invention, given by way of non-limiting example and explained with reference to the appended schematic drawings, in which:

FIG. 1 is a representation of a three-dimensional mapping of a gain as a function of vehicle speed and of a measured steering wheel torque according to the invention, FIG. 2 is a representation of a setpoint monitoring branch according to the invention, FIG. 3 is a representation of a regulation system known in the related art and already described.

FIG. 1 represents a three-dimensional mapping 3 of a gain G as a function of a longitudinal vehicle speed $V_v$ and of a measured steering wheel torque $C_{vm}$ according to the invention. The longitudinal vehicle speed $V_v$ is expressed in kilometers per hour and the measured steering wheel torque $C_{vm}$ is the absolute value of the measured steering wheel torque $C_{vm}$ expressed in Newton meters.

The three-dimensional mapping 3 comprises 2 areas of improving the feeling 5, 7 in which the gain G is strictly less than 1 and 2 assistance areas 4, 6 in which the gain G is strictly equal to 1.

The numerical values below as well as the three-dimensional mapping are given by way of example, and refer to an embodiment of the invention as represented in FIG. 1.

A first assistance area 4 extends beyond a predetermined steering wheel torque threshold $C_{vp}$ equal to 2 Nm.

A first area of improving the feeling 5 extends from a predetermined vehicle speed threshold $V_{vp}$, equal to 25 km/h, and of a zero-measured steering wheel torque $C_{vm}$ up to the predetermined steering wheel torque threshold $C_{vp}$.

The gain is substantially equal to 0 when the measured steering wheel torque $C_{vm}$ is substantially equal to 0 and the vehicle speed $V_v$ is greater than an ascent vehicle speed threshold $V_{vr}$, equal to 60 km/h, greater than the predetermined vehicle speed threshold $V_{vp}$.

The gain G varies linearly between 0 and 1 between a measured steering wheel torque $C_{vm}$ and the predetermined steering wheel torque threshold $C_{vp}$, when the vehicle speed $V_v$ is greater than the ascent vehicle speed threshold $V_{vr}$.

Below the ascent vehicle speed threshold $V_{vr}$, when the measured steering wheel torque $C_{vm}$ is substantially equal to 0, the gain G linearly varies.

The gain G varies linearly between 0 and 1 between a measured steering wheel torque $C_{vm}$ and the predetermined steering wheel torque threshold $C_{vp}$.

A second assistance area 6 extends between a zero vehicle speed $V_v$ up to the predetermined vehicle speed threshold $V_{vp}$ and extends between a low-speed steering wheel torque threshold $C_{vbv}$, equal to 0.5 Nm, below the predetermined steering wheel torque threshold $C_{vp}$, up to the predetermined steering wheel torque threshold $C_{vp}$.

A second area of improving the feeling 7 extends from a zero vehicle speed $V_v$ up to the predetermined vehicle speed threshold $V_{vp}$ and extends from a zero-measured steering wheel torque $C_{vm}$ up to the low speed steering wheel torque threshold $C_{vbv}$.

FIG. 2 represents a setpoint monitoring branch 2 of a regulation system according to the invention.

In a first step, the setpoint monitoring branch determines a deviation motor torque TOL by subtracting, from a signal corresponding to the sum of the measured steering wheel torque and the motor torque RFe, a setpoint steering wheel torque signal $C_{vc}$.

In a second step C, the setpoint monitoring branch determines the gain G using the three-dimensional mapping 3 as represented in FIG. 1. Thus, the second step C receives as input the vehicle speed $V_v$ and the absolute value D of the measured steering wheel torque $C_{vm}$.

Finally, the setpoint monitoring branch 2' performs a step B of multiplying the deviation motor torque TOL and the gain G determining a variable deviation motor torque $TOL_v$.

The gain G varying from 0 to 1, the value of the variable deviation motor torque is lower than the deviation motor torque TOL.

The setpoint monitoring branch 2' thus calculates the variable deviation motor torque $TOL_v$ corresponding to a fraction of a motor torque $C_m$ of an assist motor of an electric power steering. As in the related art represented in FIG. 3, the motor torque $C_m$ is the sum of the variable deviation motor torque $TOL_v$, a proportional motor torque $C_{mp}$ and a derived motor torque $C_{md}$.

Thus, the weight of the setpoint monitoring branch 2' in the setpoint monitoring varies as a function of the vehicle life conditions characterized by the measured steering wheel torque $C_{vm}$ and by the vehicle speed $V_v$.

When the vehicle makes many turns, that is to say when the measured steering wheel torque $C_{vm}$ is large, and more particularly greater than the predetermined steering wheel torque $C_{vp}$, the vehicle is in the first assistance area 4. In this case, the gain G is equal to 1. Thus, the deviation motor torque TOL is equal to the variable deviation motor torque $TOL_v$. The part taken in the calculation of the motor torque $C_m$ by the setpoint monitoring branch 2' is maximum. This means that the assistance provided by the driver assist motor to turn the vehicle wheels is maximum. Priority is given to helping to turn the wheels of the vehicle rather than improving the driver feeling of road deformations.

When the vehicle goes substantially in a straight line, that is to say when the measured steering wheel torque $C_{vm}$ is substantially equal to 0, the assistance provided by the assist motor to turn the wheels of the vehicle is not a priority relative to improving the feeling of the road profile. In fact, the driver will prefer to know where the wheels of his vehicle are, rather than having assistance in maneuvering the wheels of the vehicle. Thus, the gain G multiplying the deviation motor torque TOL is equal to 0, and therefore the variable deviation motor torque $TOL_v$ is equal to 0. In this life situation of the vehicle, the participation of the setpoint monitoring branch 2' in the calculation of the motor torque $C_m$ is inhibited.

However, the setpoint monitoring branch 2' is inhibited, that is to say that the gain G is equal to 0, only when the vehicle reaches a speed $V_v$ greater than the ascent vehicle speed threshold $V_{vr}$. In fact, when the vehicle speed $V_v$ is lower than the ascent vehicle speed threshold $V_{vr}$, the setpoint branch makes it possible to reduce the feeling by the driver of the vibrations and mechanical friction of the power steering system.

When the driver maneuvers the vehicle to perform a parking operation, the vehicle is in the second assistance area 6. The gain G is maximum to facilitate the maneuvering of the vehicle and limit the feeling by the driver of the vibrations and mechanical friction of the power steering system.

Finally, the three-dimensional mapping 3 varies the gain G linearly between the assistance areas 4, 6 and the gain equal to 0 so as not to make sudden variations in the gain which can disturb the feeling of the driver.

The three-dimensional mapping 3 could not vary the gain G linearly between the assistance areas 4, 6 and the gain equal to 0.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A power steering system for a motor vehicle comprising a steering wheel and an assist motor controlled by a closed loop regulation system, said regulation system determining a motor torque of the assist motor as a function of a measured steering wheel torque, by means of at least one setpoint monitoring branch calculating a deviation motor torque that is a component of the motor torque of the assist motor, the deviation motor toque being calculated by subtracting a setpoint steering wheel torque, defined as a steering wheel torque that a driver is desired to feel, from a sum of the measured steering wheel torque and the motor torque of the motor assistance, wherein the deviation motor torque is multiplied by a gain determined by a three-dimensional mapping depending in particular on a vehicle speed and the measured steering wheel torque.

2. The power steering system according to claim 1, wherein the three-dimensional mapping comprises at least one area of improving the feeling in which the gain is strictly less than 1 and at least one assistance area in which the gain is strictly equal to 1.

3. The power steering system according to claim 2, wherein a first assistance area extends beyond a predetermined steering wheel torque threshold.

4. The power steering system according to claim 3, wherein the predetermined steering wheel torque threshold is equal to or lower than a torque measurement range of a measured steering wheel torque sensor.

5. The power steering system according to claim 3, wherein a first area of improving the feeling extends from a predetermined vehicle speed threshold and of a zero-measured steering wheel torque up to the predetermined steering wheel torque threshold.

6. The power steering system according to claim 5, wherein the predetermined speed threshold is equal to or less than 80 km/h.

7. The power steering system according to claim 5, wherein a second assistance area extends between a zero vehicle speed up to the predetermined vehicle speed threshold and extends between a low speed steering wheel torque threshold, lower than the predetermined steering wheel torque threshold, up to the predetermined steering wheel torque threshold.

8. The power steering system according to claim 7, wherein the low speed steering wheel torque threshold is equal to or less than 1 Nm.

9. The power steering system according to claim 7, wherein a second area of improving the feeling extends from a zero vehicle speed up to the predetermined vehicle speed threshold and extends from a zero measured steering wheel torque up to the low speed steering wheel torque threshold.

* * * * *